June 4, 1940.   R. E. BASSETT, JR   2,203,040
MEANS FOR PURIFYING WATER
Filed May 29, 1937   2 Sheets-Sheet 1

INVENTOR.
Rex Carl Bassett Jr.
BY F. Bascom Smith
ATTORNEY.

June 4, 1940.  R. E. BASSETT, JR  2,203,040
MEANS FOR PURIFYING WATER
Filed May 29, 1937  2 Sheets-Sheet 2
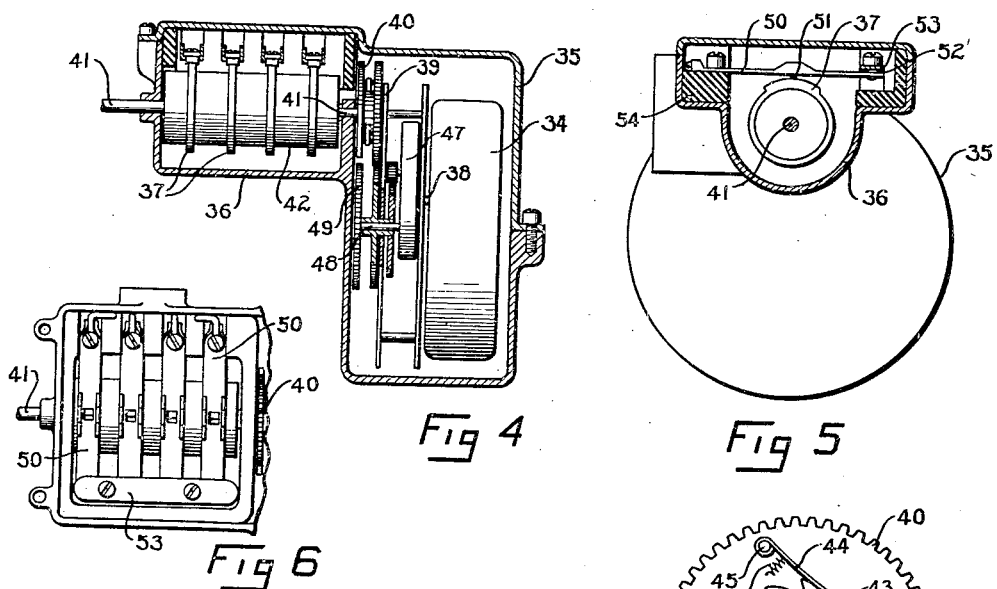
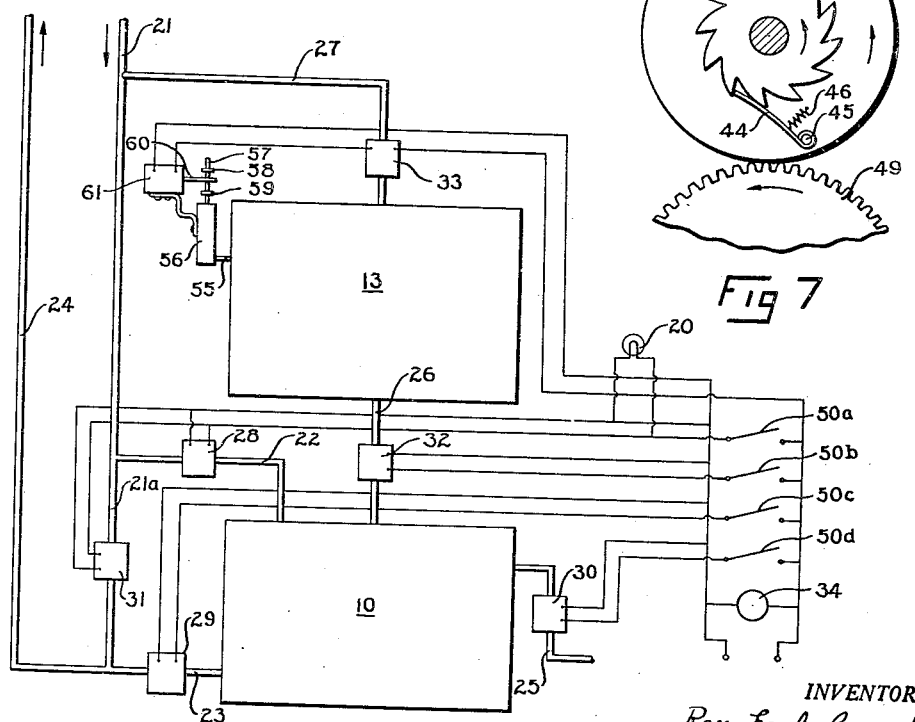
INVENTOR.
Rex Earl Bassett Jr.
BY
F. Bascom Smith
ATTORNEYS.

Patented June 4, 1940

2,203,040

UNITED STATES PATENT OFFICE 2,203,040

MEANS FOR PURIFYING WATER

Rex Earl Bassett, Jr., South Bend, Ind.

Application May 29, 1937, Serial No. 145,544

9 Claims. (Cl. 210—24)

This invention relates to water purification, and more particularly to novel means for softening water.

One of the objects of the invention is to provide novel water softening means which are so constructed and arranged as to operate automatically, the only attention necessary being to supply the apparatus at intervals of several weeks with regenerating material.

Another object of the invention is to provide a water softener of the zeolite type embodying novel valve mechanism for controlling the liquid flow to and from the softener, whereby a flow connection is maintained at all times between a source of water supply and a point of use, and reconditioning is effected automatically.

Another object is to provide a novel brine control for a water softener of the zeolite type.

Various types of automatic zeolite water softeners have heretofore been offered to the trade for use in private homes. All of these softeners which have had any commercial success whatever have been very expensive to manufacture, unsightly in appearance, difficult to install, and the same occupy a large amount of space. Hence, none of these prior art automatic softeners are available for use in apartments and small homes. Accordingly, other objects of the present invention include the provision of a novel automatic water softener which is pleasing in appearance, which can be readily installed, since the same is of unitary cabinet construction, which occupies a minimum of space, and which is inexpensive to manufacture and maintain.

A further object is to provide a novel softener which is so constructed that a suitable amount of brine is always available for regeneration and is automatically supplied to the mineral bed at predetermined intervals.

The above and other objects and advantages and novel features of this invention will appear more fully in the detailed description which is to be read with the accompanying drawings. It will be understood, however, that the drawings are for purposes of illustration only and are not to be construed as defining the limits of the invention, reference being had for this latter purpose to the appended claims.

In the drawings, wherein like reference characters refer to like parts throughout the several views, Fig. 1 is a front elevation of a cabinet constituting a portion of the novel water purifying apparatus embodying the present invention;

Fig. 4 is a side view, partly in section, of a preferred form of valve control mechanism;

Fig. 5 is an end view, partly in section, and taken on line 5—5 of Fig. 4;

Fig. 6 is a top plan view, with parts broken away and cover removed, illustrating the cam-controlled, electrical contact mechanism shown in Figs. 4 and 5;

Fig. 7 is a side elevation, partly in section and with parts broken away, illustrating one form of clutch which may be employed in the control mechanism; and, Fig. 8 is a diagrammatic view of the mechanism, including the piping and electrical circuits which have been selected for the illustrated embodiment of the invention.

In the form shown, the novel water softener comprises a brine tank mounted on and supported by a zeolite or softener tank. Both tanks are provided with flow connections from a hard water supply, and mineral or zeolite tank has flow connections with a supply line, a drain and the brine tank. Automatic valves, such as solenoid valves, control the flow through said connections, in a manner to be described hereafter, whereby hard water, after being softened, is made available at one or more points of use, except during the period of reconditioning when hard water is made available. A control unit, including a suitable constant speed motor, is mounted within the cabinet in such a position that the starting and stopping element, such as an electric switch arm, is readily accessible from the front of the cabinet. Preferably, the control unit is so designed that reconditioning is automatically effected at predetermined intervals, such, for example, as every 23.5 hours, or every 47.5 hours. The apparatus also includes means for automatically supplying a predetermined quantity of hard water to the brine tank, after each period of regeneration. All of the mechanism is housed in a cabinet for the reduction of fire and mechanical hazard and is provided with a removable top which may be easily raised so that regenerating material (common salt, in the case of a zeolite softener) may be introduced into the upper tank at intervals of several weeks. If desired, the readily removable cabinet may carry a light on its front panel to indicate the reconditioning period.

Figure 1:
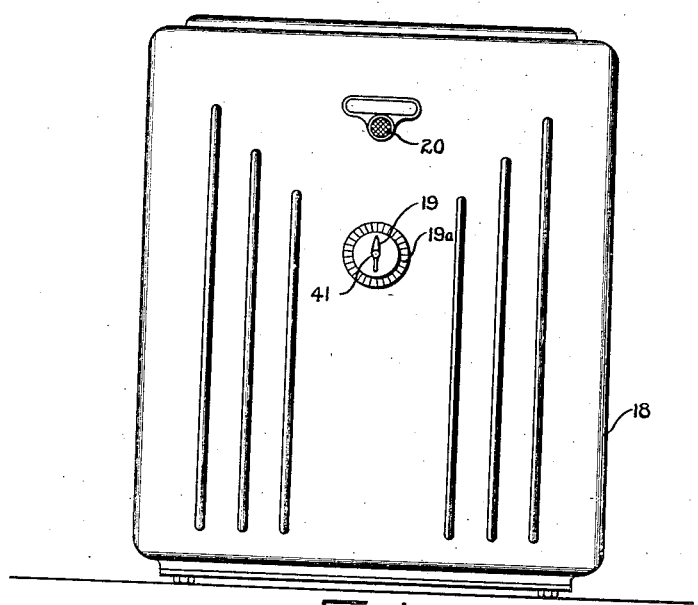
Figures 2, 3:
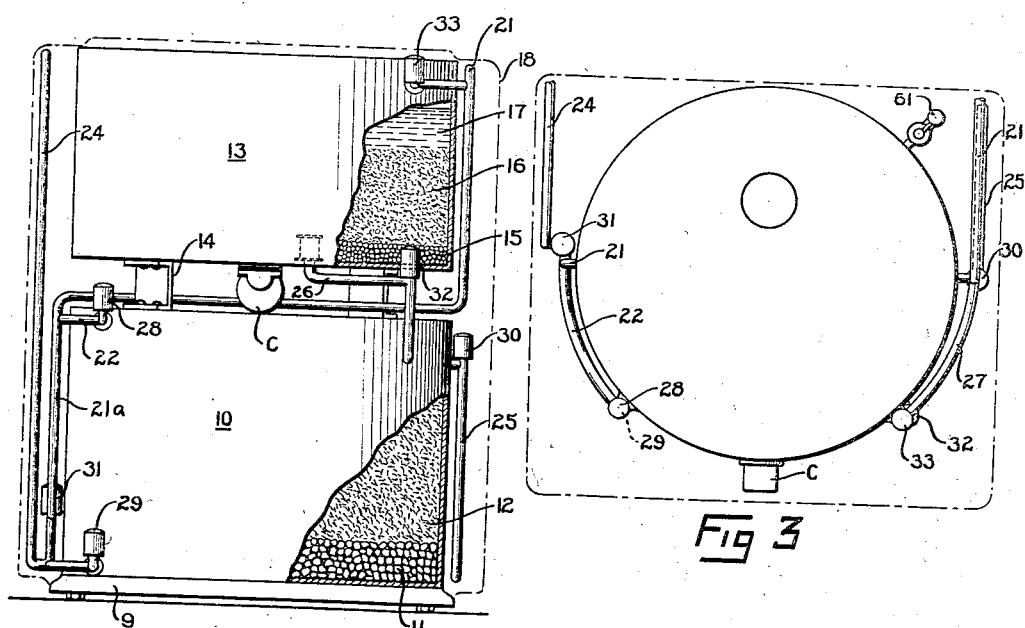
Fig. 2 is a front elevation, with parts broken away and with the cabinet of Fig. 1 shown in dot-and-dash lines, illustrating the relative disposition of mineral tank, regenerating solution tank, piping and flow control mechanism.
Fig. 3 is a top plan of the parts shown in Fig. 2.

Referring to Figs. 1 and 2, the apparatus illustrated comprises a base plate 9 on which is mounted a tank or container 10 having a layer of gravel 11 in the bottom thereof and a bed of water softening material 12, such as a zeolite, for example, above the gravel. A suitable door (not shown) is provided in the rear of tank 10 for the introduction of the gravel and softening material. Mounted on top of tank 10 is a second tank 13, the latter being supported by but spaced from the zeolite tank as by means of brackets 14. A layer of gravel 15 is preferably provided in the bottom of tank 13 and the gravel is surmounted by a bed of regenerating material 16, such as salt, and brine 17.

The two tanks, with their pipe connections and the control mechanism, are completely housed within a cabinet 18. The latter not only enhances the appearance of the apparatus but the same forms a housing for the electrical mechanism, including the automatic valves. Positioned substantially in the center of the front panel of cabinet 18 is a member 19 for controlling the operation of the softener in a manner to be pointed out hereinafter. If desired, electrical signal 20 such as a lamp is also mounted on the front panel of cabinet 18 to indicate when the softener is going through the reconditioning cycle.

As shown more clearly in Figs. 2 and 6, hard water is supplied to the flow system of the apparatus through a pipe 21 connected to a suitable source of hard water supply. During normal softening, the hard water flows through pipe 21 and a branch pipe 22 into the top portion of tank 10, and the softened and purified water flows from tank 10 through a pipe 23 and a pipe 24 to a suitable point or points of use. Container 10 is also provided with a drain connection, as for example, by means of a pipe 25, and a pipe connection 26 leads from tank 13 to container 10 whereby brine may be supplied by gravity to the zeolite tank from the upper or brine tank 13, in a manner to be described more fully hereafter.

In order that hard water may be bypassed to service around tank 10 during the reconditioning period, the conduit 21 is extended as at 21a to the discharge or supply line 23, 24. A branch pipe 27 connects with hard water supply line 21 and the top of tank 13 in order that water may be supplied to said tank to replenish the brine supply.

Valve means are provided for controlling the flow in the flow system, and preferably said means are constituted by solenoid valves suitably positioned in the tubing or piping referred to above. Since solenoid valves are well known in the art, a description of said valves per se is unnecessary. As shown more clearly in Figs. 2, 3 and 6, a solenoid valve 28 controls the flow of hard water through conduit 21 to the top of tank 10. A solenoid valve 29 controls the flow through conduit 23 leading from the lower end of tank 10 and a similar valve 30 controls flow through the drain pipe 25. Flow through the bypass pipe 21a is controlled by a solenoid valve 31 while the flow of brine by gravity into tank 10 through pipe 26 is controlled by a solenoid valve 32. Branch pipe 27 leading from the hard water supply pipe to the top of brine tank 13 is fitted with a solenoid valve 33 to control the flow therethrough.

Novel means are provided for opening the solenoid valves in proper sequence and at the proper times in order to provide for backwashing the material of the softening bed, such as zeolite, to supply the brine regenerating solution to the zeolite bed, to flush and rinse the zeolite bed, and to again initiate the softening operation. If desired, a second rinsing step may be used, as will be more fully pointed out hereafter.

As shown more clearly in Figs. 4 to 7, inclusive, the novel control means is constituted by a unitary structure C which is preferably mounted intermediate tanks 10 and 13 (see Fig. 2). The control unit comprises a constant speed electric motor 34 provided with a suitable housing 35 having an extension 36 for enclosing a plurality of contact operating cams 37. Motor 34 is effective through a shaft 38 and a train of reduction gearing generally designated 39 to rotate a segment gear 40. Said gear 40 is rigidly connected to a shaft 41 (Fig. 4) which drives a plurality of continuously rotatable washers 42 adapted to space the Bakelite cams 37 longitudinally of said shaft 41. As shown more clearly in Fig. 7, a one-way clutch, constituted by a toothed member 43 and spring cams 44, is interposed between the reduction gearing 39 and gear 40. Member 43 of the clutch is rotated in a counter-clockwise direction by gearing 39 and is effective through arms 44, which are secured to gear 40 at 45, to rotate the gear 40. If desired, coil springs 46 may be secured to said arms and to gear 40 to insure engagement of the arms with the teeth of member 43.

Synchronous motor 34 is operative through gear train 39 and clutch 43, 44 to rotate gear 40 and cams 37 through 240° in 23.5 hours or 47.5 hours, for example, depending on the desired frequency of reconditioning. If it is desired to recondition the softener every twenty-four hours, the gear train is so constructed as to rotate gear 40 through 240° in 23.5 hours. The synchronous motor 34 is also effective through the gearing generally designated as 47 to rotate a shaft 48 through one revolution per hour. Shaft 48 carries a gear 49 adapted to mesh with the teeth of segment gear 40, the latter covering an angular distance of approximately 120°. When the teeth of gear 49 mesh with the teeth of gear 40, it will be evident that said latter gear is driven at a higher rate and the cams 37 and washers 42 are also rotated at a greater rate of speed, clutch 43, 44 being rendered inoperative during the meshing of the teeth of gear 40 with the teeth of gear 49.

Cams 37 are effective through a plurality of contact arms 50 (Figs. 5 and 6) to control the circuits to the solenoid valves. Each arm 50 is provided on its lower face with a projection 51 (Fig. 5) adapted to engage with its corresponding cam 37 whereby the free end of said arm may be raised or lowered to bring a contact 52 thereon into engagement with a positive bus bar 53. The opposite end of each resilient arm 50 is rigidly secured to a suitable insulator 54 and connected through a suitable circuit to its associated solenoid. Control member 19 is mounted on the outer end of shaft 41. By suitable adjustment of said member relative to dial 19a, the cams 37 may be manually rotated to a desired position to vary the softening and reconditioning cycle.

Novel means are provided for controlling the flow of hard water into the brine tank to replenish the brine supply. As shown in Fig. 8, tank 13 is operatively connected through a pipe 55 to a cylinder 56 within which is mounted a float (not shown). A rod 57 carried by the float projects through the upper end of cylinder 56 and is provided with collars 58 and 59 adapted to engage a switch arm 60 controlling a switch 61 adapted to energize or deenergize valve 33 associated with conduct 27 leading to the top of tank 13.

*Softening.*—Valves 28 and 29 are open and valves 30, 31, 32 and 33 are closed during the softening cycle. Accordingly, when a service valve (not shown), in pipe 24 at a point of use, is opened, hard water flows through pipe 21, past valve 28, and through pipe 22 into the top of the softener tank. As this hard water passes downwardly through the zeolite bed, it is purified and softened, and after passing through the gravel bed 11 and a suitable screen (not shown) of the type commonly used in the art, it flows through pipe 24 to service.

Preferably, valves 28 and 29 are of the type which are open when the associated solenoids are deenergized while valves 30 to 33 are of the type adapted to close when their associated solenoids are deenergized. Acordingly, during softening, cams 37 are in such positions that all contacts 50 are open (Fig. 8), as well as switch 61.

It has been found that the efficiency of the softener is greatly increased if the zeolite bed is reconditioned at frequent intervals, and it is highly undesirable to permit the apparatus to remain in the softening cycle until the zeolite bed is exhausted. The average apartment dweller or small home user will secure the most efficient operation if the softener is reconditioned at short intervals, such as every forty-eight hours, for example. The novel apparatus of the present invention is so constructed that the steps of reconditioning may be automatically carried out in a few minutes, approximately thirty, for example, and this at predetermined intervals. Thus, if desired, the softener may be adjusted so that it remains in the softening cycle for 47½ hours so that a complete cycle of softening and reconditioning will be initiated every 48 hours, the reconditioning period being set to begin at 3 a. m. every other morning, at a time when no service use of water is required by the user.

*By-passing hard water to service and backwashing.*—The supply of water to service should not be interrupted in most installations, and accordingly it is preferred to arrange cams 37 in such a manner that at the end of the softening period, contacts 50a and 50d (Fig. 8) are closed substantially instantaneously. The solenoids of valves 28, 30 and 31 will now be energized, the solenoid for valve 31 being connected in parallel across the circuit of the solenoid for valve 28. As a result, drain valve 30 and by-pass valve 31 are opened, and valve 28 is closed. Hard water now flows past valve 31 into service pipe 24, and if a service valve or spigot is open, a portion thereof (or all if no spigot is open) flows past valve 29 into the bottom of tank 10 up through the gravel and zeolite bed and out through pipe 25 to the drain, whereby dirt and other impurities are washed from the zeolite bed and the compacted bed is loosened. In one embodiment, it has been found desirable to so arrange cams 37 that the backwashing step of reconditioning continues for approximately five minutes, at the end of which time contact 50c is closed by its associated cam and solenoid valve 29 is thereby closed.

*Regeneration.*—After backwashing is completed, a predetermined volume of a brine solution is introduced into the top of tank 10, and this heavy solution is permitted to settle and fill all the interstices of the zeolite bed, whereby the water softening properties of the bed are restored. All flow from tank 10 is stopped during the introduction of the brine, and preferably for a period of ten minutes thereafter, in order to properly revivify the zeolite. To this end, contact 50b is closed by its associated cam, whereby valve 32 is opened immediately after the closing of valve 29 as pointed out above. Valve 28 remains closed, and valve 31 remains open. Cam 37 associated with contact 50d simultaneously moves to such a position that said contact is opened, the associated solenoid is deenergized, and drain valve 30 is closed. The brine now flows by gravity from tank 13 into the zeolite bed 10 and revivifies or regenerates the same. After an interval of approximately two minutes, contact 50b is permitted to close by its associated cam, whereupon the solenoid of valve 32 is deenergized and the valve is closed. The brine, however, remains in the bed for an appreciable interval.

*Rinsing.*—After the zeolite bed is regenerated, it is necessary to flush all of the brine into the drain. For this purpose, valves 29 and 30 are opened by the automatic closing of contacts 50c and 50d. Hard water now flows past valve 29, through pipe 23 and upwardly through the zeolite bed, rinsing all brine out into drain pipe 25. Cams 37 may be so formed that this rinsing or flushing period may continue for approximately eleven minutes, and at the end of such period contacts 50a and 50c are opened, with the result that valves 28 and 29 will be opened and valve 31 be closed. If desired, valve 30 may be left open for approximately one minute after valve 28 is opened to provide for the final flushing of any brine which remains on the surface of the zeolite bed. If the hard water supply is of high pressure, this will usually be unnecessary, and accordingly the cams 37 may be so arranged that valve 30 is closed at the time valve 31 is closed and valve 28 is opened. The apparatus is now returned to the softening cycle and soft water is available in service pipe 24. Indicating means 20 (Figs. 1 and 8) is energized throughout the entire reconditioning cycle and accordingly the same may be in parallel with the circuit to valve 28.

*Supply of hard water to brine tank.*—At the time that valve 32 is closed to prevent further flow of brine to the zeolite bed, the liquid level in tank 13 had fallen to a predetermined plane, with the result that the float in cylinder 56 (Fig. 8), rod 57 and collar 58 moved downwardly to actuate switch arm 60, closing switch 61 and the circuit to the solenoid of valve 33. The latter is thus opened and hard water now flows through branch pipe 27 into tank 13 to replenish the brine supply. As the liquid level in tank 13 moves upwardly, the float carries rod 57 upwardly until collar 59 engages and moves arm 60 to a position such that switch 61 is again opened, solenoid valve 33 is automatically closed, and the flow of water through pipe 27 is stopped. It will be noted that valve 33 is controlled independently of the cam mechanism.

There is thus provided novel water softening apparatus which is entirely automatic in operation, inexpensive to manufacture, install, and operate and which is extremely pleasing in appearance. By mounting the brine tank on top of the softening tank, much space is conserved, installation is simplified, appearance is enhanced and the expense and trouble incident to the use of brine injectors is avoided. Moreover, the supply and replenishment of the brine is very accurately controlled, and a cabinet of light, inexpensive, and handsome design may be used to protect all parts and to constitute an electrical and mechanical shield. The synchronous motor operates continuously to drive the cams continuously. It will be noted that the cams are driven at one speed during the softening period and at a faster rate during the reconditioning period, thereby rendering the clutch effective and eliminating starting and stopping of the motor.

Since the control unit motor is only required to drive the cams 37, and this through a gear reduction, it is evident that an extremely small motor, of low current consumption, is required. In prior art devices, it has been necessary to provide a time clock or water meter in association with a synchronous motor to secure continuous automatic operation. Such attachments cost in the neighborhood of one hundred dollars and are entirely unnecessary in the present apparatus. At intervals of approximately five or six weeks, it is only necessary to add salt to tank 13 through suitable openings in the top of said tank after the cover for cabinet 18 is removed or raised in order to secure continuous and efficient operation of the apparatus. Cabinet shell 18 can be readily removed to repair or replace defective valves, if desired.

It will be noted that the regenerating solution supply and replenishment are accurately controlled in a novel manner. As will be understood by those skilled in the art, a hydrostatically controlled, diaphragm switch may be employed in place of the preferred float controlled switch, if desired. The Bakelite cams 37 may be easily stamped, mounted and adjusted to secure the desired sequence of operations. These cams may be quickly adjusted to a desired position in the cycle by moving member 19 over the legended dial 19a. Member 19 coacts with said dial to indicate the point in the cycle on which the apparatus is operating and accordingly the signal 20 is not an essential element.

Frequent reconditioning of the softener maintains the material of the softener bed in efficient operating condition and lengthens the life of the same. Moreover, it has been found that less brine and less rinsing water are required by this frequent regeneration, thereby effecting a material economy of operation. Brine pipe 26 is relatively small and the amount of brine supplied is accurately controlled. In the event of deterioration of regenerating tank 13, the same can be quickly and inexpensively replaced without the necessity for replacing the softener tank 10. In certain instances, it may be found desirable to form teeth throughout the entire periphery of gear 40 and to make gear 49 a sector gear.

It will be noted that a much smaller number of parts is required in carrying out the present invention and that said parts are less expensive and of lighter weight than any heretofore provided in a fully automatic water purifying device.

Particular reference has been made to zeolite, but the invention is not limited thereto, since by minor changes which will now be clear to those skilled in the art, the apparatus and portions thereof are adapted for use in a lime soda washing process. Moreover, the use of sodium metaphosphate or sodium pyrophosphate, among other materials, is contemplated.

Accordingly, reference will be had to the appended claims for a definition of the limits of the invention.

What is claim is:

1. In apparatus of the class described, wherein softening and regenerating solution tanks are operatively connected by a flow system, the combination therewith of electrically actuated valves for controlling the flow through said system, and means for automatically controlling said valves, said means including a continuously operating motor, a plurality of cams continuously actuated by said motor, means including a one-way drive connection interposed between said motor and cams for driving the latter at one speed, and means including an interrupted gear interposed between said motor and cams for driving the latter at a different speed.

2. In apparatus of the class described, wherein softening and regenerating solution tanks are operatively connected by a flow system, the combination therewith of electrically actuated valves for controlling the flow through said system, and means for automatically controlling said valves in a predetermined sequence, said means including a motor, a plurality of cams actuated by said motor, means interposed between said motor and cams for driving the latter at one predetermined speed and means interposed between said motor and cams for driving the latter at a higher speed.

3. In apparatus of the class described, wherein softening and regenerating solution tanks are operatively connected by a flow system, the combination therewith of electrically actuated valves for controlling the flow through said system, and means for automatically controlling the valves in a predetermined sequence, said means including a continuously operating motor, a plurality of cams for controlling the circuits to said valves, said cams being continuously actuated by said motor, means interposed between said motor and cams for driving the latter at one speed and means interposed between said motor and cams for driving the latter at a higher speed.

4. In apparatus of the class described, a softening tank, a regenerating solution tank mounted above said softening tank, a flow system including a source of hard water supply, a service connection and a drain operatively connected to said tanks, electrically operated valves for controlling the flow through said system, constant speed mechanism for controlling the opening and closing of the regenerating solution valve whereby regenerating solution is supplied by gravity to the softening tank, and electrical means controlled by the flow of said solution to control the replenishment of said solution.

5. In a water softener, the combination with a plurality of electrically operated valves, of a control unit comprising a motor, a plurality of contacts operatively connected to said valves, cams for actuating said contacts, a one-way driving connection between said motor and cams, and manual means for rotating said cams to vary the cycle of operation of the softener.

6. In a water softener of the type employing electrically controlled valves for controlling the flow through the softener flow system, a plurality of contacts for controlling said valves, means for actuating said contacts, a motor, and means operatively connecting said motor and actuating means for driving the latter at different speeds during predetermined portions of each cycle of operation of said actuating means.

7. In control apparatus for a water softener, a flow system, a plurality of electrically operated valves, a plurality of contact cams operatively associated with said valves, a motor, means interposed between said motor and cams and actuated by said motor, including a one-way driving connection for driving said cams at a predetermined speed, and means actuated by said motor and adapted to be drivably connected to said cams for actuating the latter at a different rate of speed.

8. In a water softener, a flow system, a plurality of electrically operated valves for controlling the flow through said system and control means for said valves including a motor, a plurality of cams driven thereby, a one-way driving connection between said cams and said motor, and manual means for adjusting the cams relative to said motor whereby the cycle of operations of the softener may be varied.

9. In an automatic water softener, a flow system, a plurality of valves in said system, a plurality of control members for said valves, means for continuously actuating said control members at one rate of speed, said means including a one-way clutch, and means adapted for engagement with said first-named means for actuating said control members at a different rate of speed.

REX EARL BASSETT, Jr.